US009762954B2

(12) United States Patent
Gupta et al.

(10) Patent No.: US 9,762,954 B2
(45) Date of Patent: Sep. 12, 2017

(54) SYSTEM AND METHOD FOR STREAMING AUDIO OF A VISUAL FEED

(71) Applicant: Verizon Patent and Licensing Inc., Basking Ridge, NJ (US)

(72) Inventors: Nisheeth Gupta, Irving, TX (US); Ernesto Vazquez, Dallas, TX (US); Siddharth Chitnis, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 13/921,792

(22) Filed: Jun. 19, 2013

(65) Prior Publication Data

US 2014/0380382 A1    Dec. 25, 2014

(51) Int. Cl.
*H04N 21/439* (2011.01)
*H04N 21/83* (2011.01)
*H04N 21/482* (2011.01)
*H04N 21/41* (2011.01)
*H04N 21/442* (2011.01)

(52) U.S. Cl.
CPC ....... *H04N 21/439* (2013.01); *H04N 21/4126* (2013.01); *H04N 21/44227* (2013.01); *H04N 21/4826* (2013.01); *H04N 21/482* (2013.01)

(58) Field of Classification Search
CPC ............... H04H 20/79; H04N 21/4126; H04N 21/42684; H04N 21/4316; H04N 21/439; H04N 21/44231; H04N 21/4856; H04N 21/4307; H04N 21/6131; H04N 21/6137; H04N 7/15; H04N 21/8106; H04N 21/43637; H04N 21/4396; H04N 21/4398; H04N 5/607; H04L 67/02; H04L 65/4038; H04L 29/06414; H04L 65/403; H04L 65/4069
USPC ............... 725/52, 53, 56, 57, 80–82, 85, 95; 379/101.01
See application file for complete search history.

(56) References Cited

U.S. PATENT DOCUMENTS

| 8,239,897 | B2 * | 8/2012 | Wadey | H04N 5/45 348/565 |
| 8,582,565 | B1 * | 11/2013 | Morsy | H04L 67/02 348/14.04 |
| 2004/0196405 | A1 * | 10/2004 | Spinelli | H04N 5/45 348/565 |
| 2006/0062363 | A1 * | 3/2006 | Albrett | 379/101.01 |
| 2009/0288132 | A1 * | 11/2009 | Hegde | 725/141 |
| 2010/0146572 | A1 * | 6/2010 | Pearson | 725/110 |

* cited by examiner

*Primary Examiner* — Pankaj Kumar
*Assistant Examiner* — Alazar Tilahun

(57) ABSTRACT

An approach for streaming audio feeds independently from visual feeds is provided. The approach includes processing programming information associated with one or more first devices proximate a user to determine one or more programs presented by the one or more first devices. The approach also includes presenting a user interface to the user for selecting from among the one or more programs. In addition, the approach includes determining an input from the user for selecting at least one of the one or more programs. The approach further includes streaming an audio feed of the at least one of the one or more programs to a second device associated with the user.

20 Claims, 12 Drawing Sheets

SYSTEM AND METHOD FOR STREAMING AUDIO OF A VISUAL FEED

BACKGROUND INFORMATION

Service providers are continually challenged to deliver value and convenience to consumers by, for example, providing compelling network services. One area of development has been the use of various methods to experience media. Media is often received either by television or mobile device screens. For example, a television or mobile device may display a content item. The user may receive the visual and audio experience of the content item simultaneously from the television or mobile device. As such, fully experiencing the content item is often contingent on few distractions in the surrounding area or low ambient sound. Unfortunately, user receipt of audio and visual components of a content item may be compromised by ambient conditions when the components are delivered to the user through a single device. As such, service providers and users face challenges in maintaining the full audiovisual experience where background conditions impact part of the audiovisual display.

Based on the foregoing, there is a need for streaming audio feeds independently from visual feeds.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for adapting a metadata framework in accordance with metadata manipulations, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to processing cloud computing and services, it is contemplated that these embodiments have applicability to other computing technologies and architectures.

Figure 1:
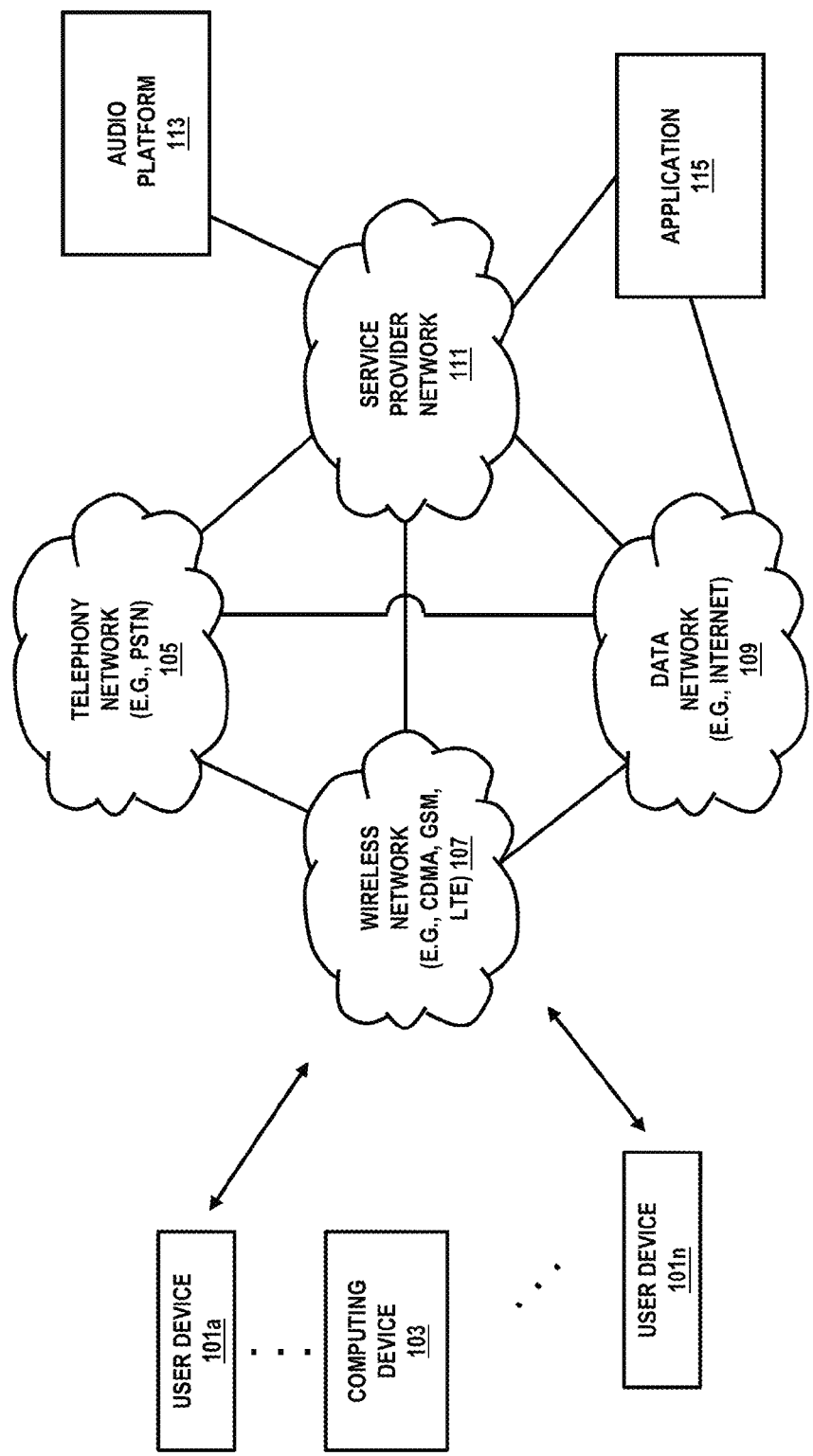
FIG. 1 is a diagram of a system capable of streaming audio feeds independently from visual feeds, according to an exemplary embodiment.

FIG. 1 is a diagram of a system 100 for streaming audio feeds independently from visual feeds, according to one embodiment. For the purpose of illustration, system 100 for independently streaming audio feeds from visual feeds involves streaming audio feeds to user devices 101a-101n (or user devices 101), where the audio feeds are retrieved from another device, for example, computing device 103. According to certain embodiments, users at user or client devices may access the audio feeds provided by computing device 103 over one or more networks, such as telephony network 105, wireless network 107, data network 109, and/or service provider network 111. Additionally, the system 100 may employ audio platform 113 to determine specific programs to stream to the user devices 101. While specific reference will be made hereto, it is contemplated that system 100 may embody many forms and include multiple and/or alternative components and facilities.

It is observed that consumers have increasing options in how to experience media. Traditionally, consumers experience televised programs on television sets. Now, mobile or user devices may also provide access to media. However televised programs are rarely used in conjunction with user devices or user devices rarely supplement the television watching experience. As a consequence, a void exists for effective and efficient delivery of televised content where television programming is compromised due to background or ambient distractions, such as in bar or restaurant settings.

Therefore, the approach of system 100, according to certain exemplary embodiments, stems from the recognition that consumers can benefit from receiving audio feeds independently from video feeds. In one such embodiment, consumers may experience audio feeds and video feeds as provided by different devices. For example, consumers or users may encounter televisions in public places, where volume on the televisions is muted. For instance, gyms, restaurants, sports bars, pubs, and airports often provide televisions, but mute the sound. System 100, however, may permit users to listen to the audio of the muted television programming on personal devices associated with the user. Such devices or user devices 101 may include personal smartphones, tablets, laptops, or any device associated with the user that permits audio access. In one embodiment, the system 100 may determine the television program for audio streaming based on programming provided via a set-top box. Alternately, the system 100 may determine the television program for audio streaming based on audio channels provided via a local multimedia hub.

In the first embodiment, a set-top box may stream audio to a user device. For example, a user in a venue such as a sports bar or gym may wish to listen to audio commentary of a muted televised broadcast. A computing device 103 in such a situation may be a set-top box associated with a television set. In one embodiment, a computing device 103 may be configured to stream audio over WiFi to a user device 101. For example, a user may access an audio feed via an application. For instance, a user may join a local WiFi network, download an application, launch an application wherein the application communicates with set-top boxes (or one or more computing devices 103) over the local WiFi. By doing so, the user contacts only set-top boxes within the local WiFi or set-top boxes in the local vicinity of the user. Then, the user may search and discover channels to which the local set-top boxes are tuned. For example, the user may tap into Search and Discovery functionalities of the set-top boxes. The user devices 101 may then generate a channel list to present to a user based on the channels offered by the set-top boxes. Once a user selects a channel, the system 100 may provide the user with the ability to listen to the audio feed of the selected channel using his user device 101. In one embodiment, the computing device 103 may permit the audio feed by connecting to a local network that is WiFi enabled. In a further embodiment, the computing device 103 may strip the audio feed from the user-selected televised broadcast and stream it wirelessly over WiFi to a user.

Furthermore, the system 100 may determine a channel list based on user locations. For example, the system 100 may determine a local WiFi network given a user's context information and find set-top boxes available within that local WiFi network. Additionally, the system 100 may determine channels for audio feed streaming by determining a currently playing program. For example, a user may use sensors associated with his user device 101 to capture information to determine a currently playing program. For instance, a user may point his user device 101 at a television screen to capture an image on the screen, where the system 100 may then use image recognition to determine the television program associated with the captured screen. In one scenario, a user may capture the televised program. In another scenario, a user may capture an image associated with a channel. Such an image may include a channel logo. User devices 101 may further use radio-frequency identification, quick response codes, or a combination thereof to determine television programming.

In the second embodiment, the system 100 may determine audio feeds to stream based on a local multimedia hub. In one such embodiment, the multimedia hub may strip audio feeds from all channels and maintain the audio on an audio service. In one embodiment, the multimedia hub may exist as part of the data network 109. Furthermore, the multimedia hub may maintain audio specific to a location, where the user may receive an audio stream based on his location. For example, a user may access the audio service by accessing the internet or by dialing a phone number. To employ the internet, a user may, download an application onto his user device 101, launch the application, use the internet to search and discover channels that one or more local computing devices 103 are tuned to, select a channel from a channel list based on the discovered channels, and listen to muted television broadcasts on the user device 101 over the data network 109. In one embodiment, the system 100 may further determine when a program (and its associated audio stream) is airing a commercial. In such a situation, the system 100 may include a listing or alternate audio feed options for the user to access while the originally selected program is on commercial.

To access the audio stream by dialing a phone number, a user may, for example, dial a specified number. Then, a user may select a channel, for example, using interactive voice response (IVR) to listen to the audio feed associated with the selected channel. For such a case, a user may access the audio feed of televised programming, for example, while driving. Furthermore, such a scenario permits a user to access an audio feed without downloading or launching an application. Instead, a user may leverage phone functions of a user device 101 to receive an audio feed associated with televised content.

In a further embodiment, the system 100 may include social notification and interaction, closed captioning, and/or digital audio recording tied to streaming audio feeds. Social notification and interaction may allow a user to share and or interact with other users receiving the same audio feed. For example where a user launches an application to receive an audio feed, the application may prompt a user to notify other users of the feed his is receiving. Furthermore, the application may allow a user to see and interact with others on a social network. For example, the system 100 may include a notification or display for users tuning into the same audio feed. In doing so, the system 100 may foster interaction between users interested in the same audio feed.

Closed captioning may include displaying closed captioning on a user device, along with display controls comprised of font size, background color, text color, or a combination thereof. Digital audio recording may include allowing a user to record audio on their personal device to listen to later. Where the audio is saved directly to a user device 101, device storage limitations may be a constraint on the length of audio stored. Therefore, the system 100 may further include the option of accessing the audio from a previous broadcast by way of the audio server and/or offering the option of storing the audio on an alternate storage medium, for example, a cloud service.

In one embodiment, user devices 101 receive audio feeds based on televised programming provided by one or more computing devices 103. In other words, user devices 101 are endpoints where a telephony network 105, wireless network 107, data network 109, and/or service provider network 111 may work in conjunction with the audio platform 113 to determine and create an audio feed from programming available via the computing device 103. In one embodiment, an application 115 may provide the interface between user devices 101, a computing device 103, and the audio platform 113 for the user to access, view, and select an audio feed of choice.

In one embodiment, computing device 103 may be comprised of a set-top box. In one embodiment, computing device 103 may be in contact with a local WiFi including wireless network 107, where channels available on the computing device 103 are the channels available by the wireless network 107. In another embodiment, computing device 103 may be comprised of a set-top box in conjunction with a multimedia hub, for example, a multimedia hub included in the data network 109. In one embodiment, the multimedia hub may include a server containing audio feeds from all channels provided via a set-top box computing device 103. It is noted that each of the user devices 101 may utilize the computing device 103 to determine programs available for audio feed consumption and to stream audio feeds of selected programs out of the programs available.

In one embodiment, the audio platform 113 and/or application 115 is maintained by a service provider network 111, where the service provider network 111 provides user devices 101 with the service of streaming select audio feeds. In one embodiment, the audio platform 113 may determine programs presented via a computing device 103, either in terms of programs available by way of the computing device 103 or a program currently being played by the computing device 103. The audio platform 113 may further detect one or more computing devices 103 for the available programming. For example, the audio platform 113 may perform a location-based search for computing devices 103 proximate user devices 101. The audio platform 113 may also receive user selections of programs and stream audio feeds based on the selections. For example, the audio platform 113 may strip audio from program channels selected by users and stream the feeds to users. In another embodiment, the computing device 103 may strip the audio from program channels and the audio platform 113 may stream the resulting audio feed to user devices 101.

In another embodiment, the application 115 may prompt the execution of the service delivered by the audio platform 113. For example, user devices 101 may launch application 115 to trigger selection and receipt of audio feeds. In a further embodiment, application 115 may monitor changes in user devices 101 or computing device 103 for their effect on available programming or audio feeds. For example, application 115 may launch automatically upon entering a local WiFi and detecting a computing device 103. In another instance, application 115 may send notifications to user devices 101 where context information associated with user devices 101 indicate exit or entrance into different local WiFi that impacts programming capabilities or options. In one embodiment, the application 115 may further aggregate user selection information and preferences so that application launching, program selections and listings are presented according to collected user selection information.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

By way of example, user device 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 101 can support any type of interface to the user (such as "wearable" circuitry, etc.). In one embodiment, the application 115 may be any type of application that is executable at the user device 101.

The service provider network 111 can interact with one or more networks, such as a telephony network 105, a wireless network 107, and/or a data network 109. The service provider network 111 can include one or more applications 115 that provide services to the service provider network 111. Additional services associated with, for example, the telephony network 105, the wireless network 107, or the data network 109, may also interact with the user devices 101, computing device 103, audio platform 113, and application 115. By way of example, a service associated with the data network 109 can store information to files associated with the applications 115 of the service provider network 111. For example, a multimedia hub-based service associated with the data network 109 may collect and store audio feeds or files associated with programming presented by the computing device 103. Then, applications 115 may provide an interface for user devices 101 to receive the audio feeds from the data network 109.

For illustrative purposes, the networks 105-111 may be any suitable wireline and/or wireless network, and be managed by one or more service providers. For example, telephony network 105 may include a circuit-switched network, such as the public switched telephone network (PSTN), an integrated services digital network (ISDN), a private branch exchange (PBX), or other like network. Wireless network 107 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 109 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-111 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions.

According to exemplary embodiments, end user devices may be utilized to communicate over system 100 and may include any customer premise equipment (CPE) capable of sending and/or receiving information over one or more of networks 105-111. For instance, voice terminal may be any suitable plain old telephone service (POTS) device, facsimile machine, etc., whereas mobile device (or terminal) may be any cellular phone, radiophone, satellite phone, smart phone, wireless phone, or any other suitable mobile device, such as a personal digital assistant (PDA), pocket personal computer, tablet, customized hardware, etc.

Figure 2:
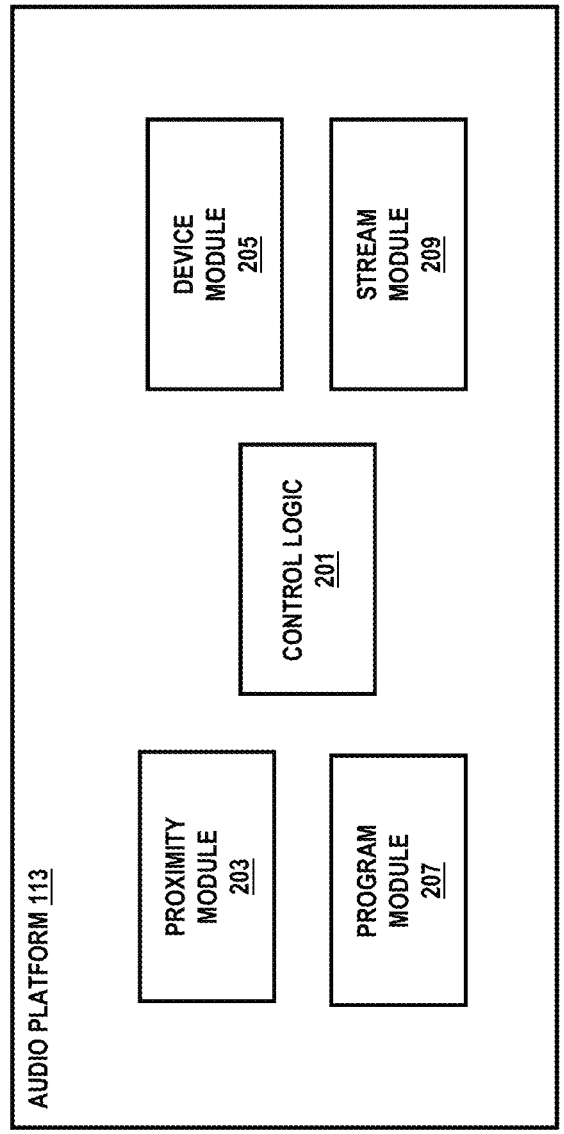
FIG. 2 is a diagram of an audio platform capable of determining programs presented by devices and streaming the audio feed of at least one of the programs to another device, according to an exemplary embodiment.

FIG. 2 is a diagram of an audio platform capable of determining programs presented by devices and streaming the audio feed of at least one of the programs to another device, according to one embodiment. Audio platform 113 may comprise computing hardware (such as described with respect to FIG. 11), as well as include one or more components configured to execute the processes described herein for providing the processing services of system 100. In one implementation, the audio platform 113 contains a control logic 201, proximity module 203, device module 205, program module 207, and stream module 209. The control logic 201 performs control logic functions and facilitates coordination among the other components of audio platform 113. In one embodiment, the control logic 201 and proximity module 203 may determine the first devices and second devices proximate one another. For example, where a set-top box is a first device and a user device 101 is a second device, the control logic 201 and proximity module 203 may determine the context information of the user device 101 second device. Then, the control logic 201 and proximity module 203 may poll the vicinity around the user device 101 to detect set-top boxes near the user device 101.

In one embodiment, the control logic 201 and proximity module 203 operate using a distance threshold the where the control logic 201 and proximity module 203 may detect set-top boxes within the distance threshold from the user device 101. For example, the control logic 201 and proximity module 203 may determine distance thresholds based on interior settings modeling a user in an indoor, bar setting. The control logic 201 and proximity module 203 in this case may then determine a distance threshold based on the size of the bar (on the scale of feet or meters). In another instance, the control logic 201 and proximity module 203 may determine a distance threshold for a user in transit, for example, wishing to hear the audio feed for a channel on his commute to work. Then, the control logic 201 and proximity module 203 may determine the distance threshold in the span of miles or kilometers.

In one scenario, the control logic 201 and proximity module 203 may vary the distance threshold based on information detected from the second device. For example, if the control logic 201 and proximity module 203 may determine that context information from the second device indicates that the device (and thus an associated user) is at a bar. Then, the control logic 201 and proximity module 203 may determine the size of the bar and set the distance threshold according to the square footage of the specific bar. Alternately, the control logic 201 and proximity module 203 may find that context information indicates that a user is likely traveling along a highway. Then, the control logic 201 and proximity module 203 may set a distance threshold on the scale of miles. For instance, control logic 201 and proximity module 203 may determine the context information of a user device and set the usual radius from which programming is broadcast. In such a case, the control logic 201 may base the distance threshold off the primary service area radius for broadcast signals.

In one embodiment, the control logic 201 and device module 205 may determine or detect devices within that set distance threshold. In one embodiment, the control logic 201 and device module 205 may determine the detected devices by accessing a database of set-top boxes associated with set-top box locations. Then, the control logic 201 and device module 205 may compare second device contextual location to the set-top box locations and render a list of set-top boxes that fall within the distance threshold.

In one embodiment, the control logic 201 and program module 207 may determine the programs presented by a first device. In one embodiment, the control logic 201 and program module 207 may determine that programs available via a first device, for example, a set-top box. For example, the control logic 201 and program module 207 may determine all the programs available via set-top boxes detected proximate a user device. Then, the control logic 201 and program module 207 may render a listing of all the programs available to a user for streaming to the user device. In another embodiment, the control logic 201 and program module 207 may determine a program being played on a set-top box. For example, a user may pinpoint a particular first device from which he wishes to receive an audio feed. For instance, a user may pinpoint a first device by pointing his user device to a first device or a device associated with the first device. One such case may involve the user pointing his user device at a television screen and capturing a signal from the television screen that is associated with the set-top box or programming from the set-top box. The signal may include, for example, a radio frequency identification (RFID), a quick response code (QR code), or some screen capture of what is playing on the television screen. Based on the captured signal, the control logic 201 and program module 207 may determine the program played on the television screen. For example, a user may use sensors on his user device and/or a user device camera function to capture an image of a television screen. The control logic 201 and program module 207 may then employ image recognition to determine the program playing and offer a user the option of receiving an audio feed associated with the program.

In one embodiment, the control logic 201 and stream module 209 may determine an audio feed of programs selected by users and stream the audio feed to user devices. For example, the control logic 201 and stream module 209 may strip a program of its audio file and stream it wirelessly to a user. For instance, the control logic 201 and stream module 209 may differentiate an audio file from a video file or audio data from video data associated with a televised program and maintain the audio file either in storage or to stream to user devices 101. In another embodiment, the control logic 201 and stream module 209 may maintain a feed associated with televised programming and simply provide user devices 101 with optional display functions. For instance, user devices 101 may elect to display only the audio of the televised programming, have the entire televised programming displayed on the user device 101, or have associated data, for example, subtitles, displayed to the user devices 101.

Figure 3:
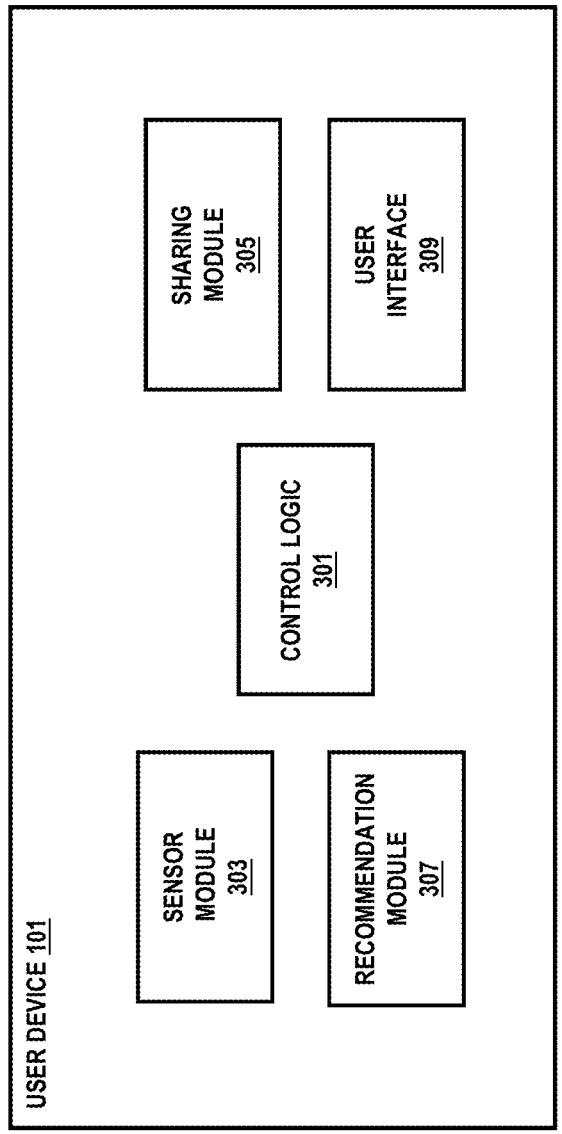
FIG. 3 is a diagram of a user device capable of determining programs presented by devices and streaming the audio feed of at least one of the programs to another device, according to an exemplary embodiment.

FIG. 3 is a diagram of a user device capable of determining programs presented by devices and streaming the audio feed of at least one of the programs to another device, according to one embodiment. User device 101 may comprise computing hardware (such as described with respect to FIG. 11), as well as include one or more components configured to execute the processes described herein for providing the processing services of system 100. In one implementation, user device 101 contains a control logic 301, sensor module 303, sharing module 305, recommendation module 307, and user interface 309. The control logic 301 performs control logic functions and facilitates coordination among the other components of user device 101. In one embodiment, the control logic 301 and sensor module 303 may determine first devices or other devices proximate the user device 101. For example, the control logic 301 and sensor module 303 may determine context information associated with the user device 101 and locate first devices or other user devices based on the context information.

For instance, the control logic 301 and sensor module 303 may access a set-top box database containing set-top box location information and determine set-top boxes located within a certain radius of the user device 101 based on determined context information. In one embodiment, the control logic 301 and sensor module 303 may also contribute to determining programming options. For example, the control logic 301 and sensor module 303 may interact with the audio platform 113 where the audio platform 113 determine programming information based on location information of user device 101 as determined by control logic 301 and sensor module 303. For another example, the control logic 301 and sensor module 303 may help determine programming options in capturing sensor information associated directly with programming, for instance, RFID, QR codes, or images of programming.

In one embodiment, the control logic 301 and sharing module 305 may determine other users or devices for which a user associated with user device 101 may wish to interact. For example, the control logic 301 and sharing module 305 may determine social network information, proximity information, interest information, or a combination thereof. Social network information may include contacts associated with the user, either stored in the user device 101, within social networks used by a user, or by the user's association or sharing habits with social tools or other users. Proximity information may include other users or devices proximate the user or user device 101 (for example, as determined by the control logic 301 and sensor module 303). Interest information may include grouping the user based on user profile, tracked user habits, other users associated with the user, or a combination thereof. The control logic 301 and sharing module 305 may determine users or devices with which the user may wish to share his audio feed experience or interact with through their audio feed experience.

In one embodiment, the control logic 301 and recommendation module 307 may determine a programming recommendation. For example, the control logic 301 and recommendation module 307 may provide the recommendation based on audio streams of other users or devices. For example, the control logic 301 and recommendation module 307 may determine users similar to the user (either in social networks, location, or interests as previously described) and offer the user programming based on the programs the similar users are receiving.

In one embodiment, the control logic 301 and user interface 309 may generate a display for programming listings and selections, sensor information, recommendations, sharing options, or a combination thereof. For example, the control logic 301 and user interface 309 may generate a display for users to select or input one or more programs after the audio platform 113 and other components of the user device 101 determine the programs available for streaming an audio feed. In another example, the control logic 301 and user interface 309 may offer a confirmation where a user and audio platform 113 use sensor information to determine one or more programs, first devices, or a combination thereof. For instance, the control logic 301 and user interface 309 may offer a display of a captured image and request user confirmation that the image is a capture to aid the audio platform 113 in determining programming. In such a scenario, the control logic 301 and user interface 309 may also offer the user the option to re-take the capture if the image is out-of-focus or blurry. Furthermore, the control logic 301 and user interface 309 may display recommendations and sharing options including a listing of possible neighboring users or devices a user may interact with, along with the options for sharing. For example, the control logic 301 and user interface 309 may offer the option of a live chat with other users receiving an audio feed that a user wishes to stream to his own device or the control logic 301 and user interface 309 may simply offer a display where other users may see that a user is receiving the same feed. For instance, the control logic 301 and user interface 309 may cause a green screen display for users receiving the audio feed for a particular baseball game so users who all have a green display screen may see the other users nearby who are interested in the same baseball game.

Figure 4:
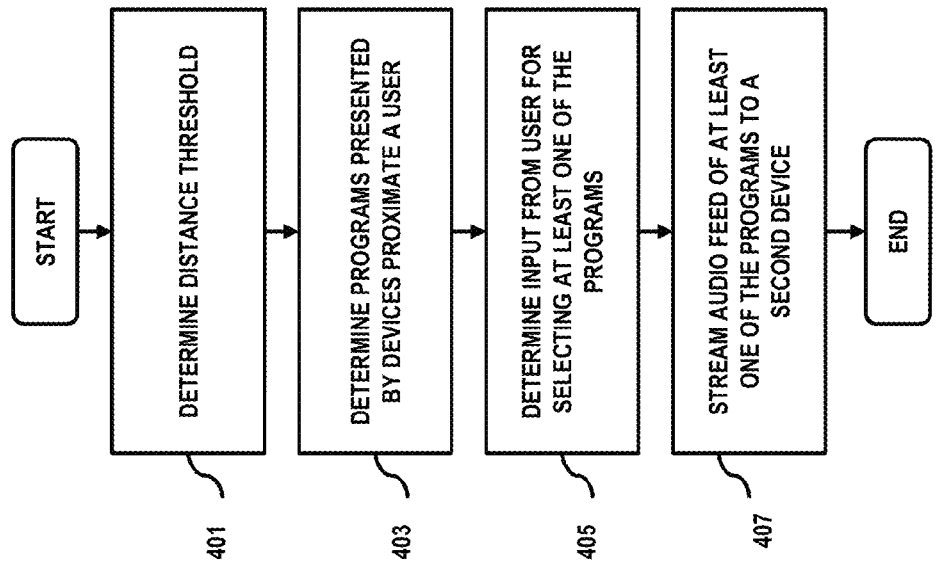
FIG. 4 is a flowchart of a process for delivering an audio feed for a program proximate a user device, according to an exemplary embodiment.

FIG. 4 is a flowchart of a delivering an audio feed for a program proximate a user device, according to one embodiment. In step 401, the control logic 201 may determine a distance threshold from a device, for example, a user device. For example, receiving and audio feed may include the scenario where an individual is at a bar. In this case, the control logic 201 may determine a distance threshold that reflects the distance equivalent of the perimeter or size of most bars, so the control logic 201 may measure the distance threshold in feet or meters. In another case, users may receive audio feeds while driving. In such a scenario, the distance threshold for detecting a set-top box or broadcast signal may be on the scale of miles or kilometers. Once the control logic 201 sets a distance threshold, the control logic 201 may process programming information associated with one or more first devices proximate a user to determine one or more programs presented by the one or more first devices and present a user interface to the user for selecting from among the one or more programs (step 403). For example, the device may include a set-top box offering broadcast programs. In one embodiment, the control logic 201 may take the user's position based on context information from a device associated with the user. For example, if a user's mobile phone is at location "x", the control logic 201 may take the user's position to be "x" and determine the one or more first devices proximate position x. In one embodiment, the first devices may determine one or more programs once it identifies the one or more devices and offer a user interface from which a user may select a program. As previously discussed, the one or more devices may include set-top boxes, where control logic 201 may determine a program being presented by a set-top box once it identifies the set-top box.

Next with step 405, the control logic 201 may determine an input from the user for selecting at least one of the one or more programs. For example, the control logic 201 may offer the determined one or more programs presented as a list for the user to select from. Once the control logic 201 determines the selection of a program, the control logic 201 may stream an audio feed of the at least one of the one or more programs to a second device associated with the user (step 407). The control logic 201 may execute the process 400 wherein the one or more first devices are one or more set-top boxes and wherein the second device is a mobile device. By extension, step 401 may mean determining the one or more first devices proximate the user based on a distance threshold from the second device.

Figure 5:
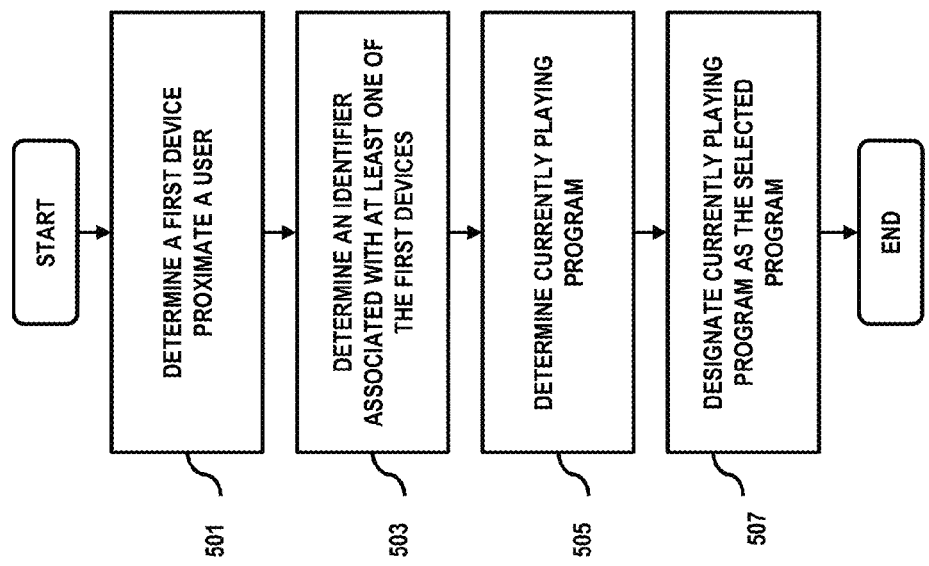
FIG. 5 is a flowchart of a process for determining the audio feed to stream based on the input from the user, according to an exemplary embodiment.

FIG. 5 is a flowchart of a process for determining the audio feed to stream based on the input from the user, according to one embodiment. For example, in steps 501 and 503, the control logic 201 may determine a first device proximate a user, then determine the input from the user for selecting programs presented by the first device wherein the input specifies an identifier associated with at least one of the one or more first devices. For example, set-top boxes may each be associated with identifiers. Various set-top boxes in the vicinity of the user may play different programs.

In one embodiment, specifying an identifier associated with a set-top box may include capturing sensor information from the second device and determining the one or more programs, the one or more first devices, or a combination thereof based on the sensor information. By way of example, the control logic 301 and sensor module 303 may include be any type of sensor. In certain embodiments, the control logic 301 and sensor module 303 may include, for example a network detection sensor for detecting wireless signals or network data, receivers for different short-range communications (e.g., Bluetooth, WiFi, near field communication etc.) and the like. For example, the control logic 301 and sensor module 303 may determine the presence or availability of local WiFi.

In another example, the control logic 301 and sensor module 303 may detect RFID, QR code, image capture and image recognition, or a combination thereof to determine programs or set-top box. The sensor information may then include the information from the RFID, QR code, or an image captured by camera. For instance, a user may point his mobile phone or other user device to a television set to capture an RFID or QR code associated with the programming on the television screen or the set-top box facilitating the programming display on the television screen. In another instance, the user may take a picture of a television screen and the control logic 201 may determine the programming by matching the captured image with images from broadcast television signals. Sensor information may also include location or context information as previously discussed with regard to location-based searches. As such, the sensor information includes camera sensor information, microphone sensor information, near-field communication sensor information, or a combination thereof. Identifying the set-top box (by identifier) may help the control logic 201 with step 505 of determining a currently playing program associated with at least one of the one or more first devices. Then for step 507, the control logic may designate the currently playing program as the selected at least one of the one or more programs.

Figure 6:
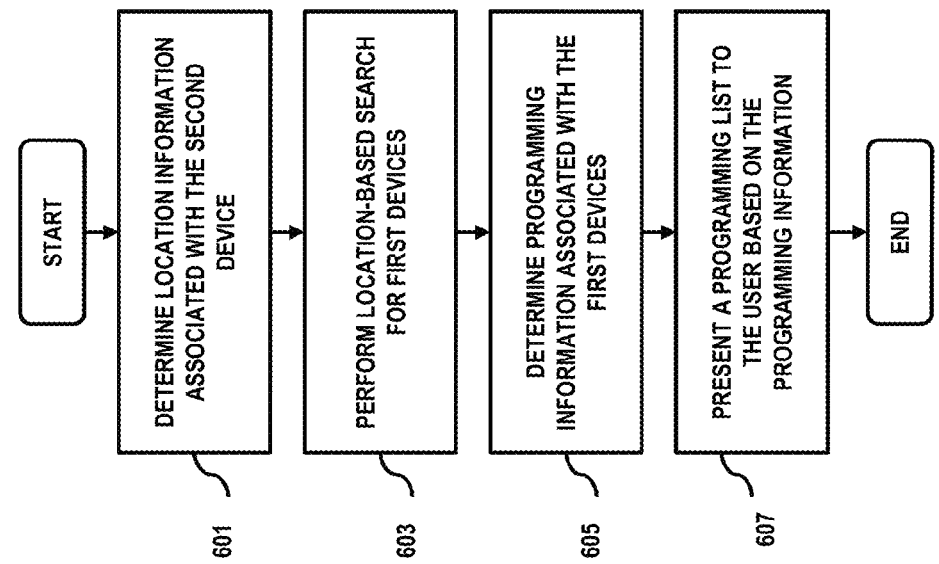
FIG. 6 is a flowchart of a process for determining the first device based on location information associated with the second device, according to an exemplary embodiment.

FIG. 6 is a flowchart of a process for determining the first device based on location information associated with the second device, according to one embodiment. For example in step 601, the control logic 201 may perform a location-based search for the one or more first devices based on location information associated with the second device (step 603). For example, the control logic 201 may determine the context information of the second device, as in the user device. The control logic 201 may then detect set-top boxes based on a distance radius around context information associated with the second device. Next, the control logic 201 may determine programming information associated with the one or more first devices or set-top boxes for step 605. Set-top boxes are tuned, for instance, to have access to various television signals and connect to networks. Once a set-top box is identified, the control logic 201 may determine the programming information of television signals accessible by the identified set-top box. Next with step 607, the control logic 201 may interact with the user devices 101 to present a programming list to the user based on the programming information.

Figure 7:
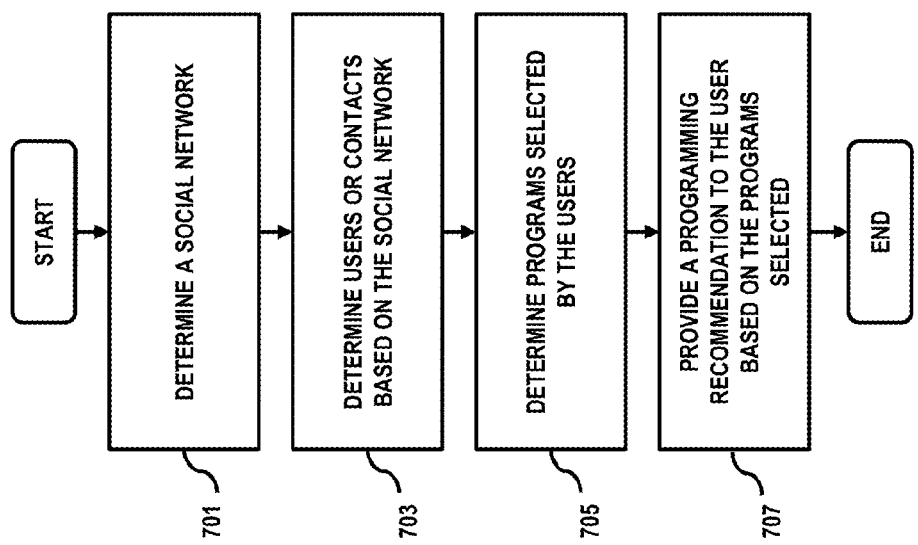
FIG. 7 is a flowchart of a process for providing recommendations for audio feeds based on other users, according to an exemplary embodiment.

FIG. 7 is a flowchart of a process for providing recommendations for audio feeds based on other users, according to one embodiment. For example, control logic 201 may determine a social network or proximity associated with a user (step 701). Then, the control logic 201 may determine other users possibly related to the first user, for instance by social circles or proximity (step 703). For example, the control logic 201 may interact with user devices of the first user to determine contacts, social network contacts, and/or other devices in the vicinity of the first user by detecting context information of devices within a radius of the first device. Then, the control logic 201 may determine the programs selected by the other users (step 705). Once the control logic 201 determines the programs selected by the other users, the control logic 201 may provide a programming recommendation to the user based on the one or more programs selected for stream by one or more users (step 707). The control logic 201 may determine the one or more users based on social network information, proximity information, or a combination thereof.

Figure 8A:
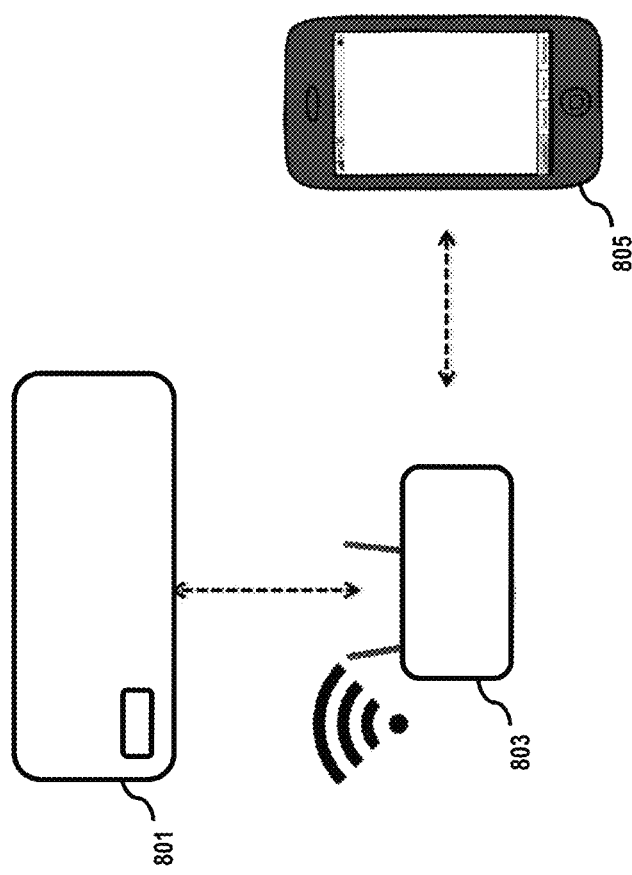
FIG. 8A is a diagram of a system that executes the processes of FIG. 4, according to an exemplary embodiment.

FIG. 8A is a diagram of a system that executes the processes of FIG. 4, according to one embodiment. In one embodiment, system 800 may include a set-top box 801, router 803, and mobile device 805 in communication via a local WiFi network. In one embodiment, set-top box 801 may continually provide programming via the WiFi network propagated by router 803. In one embodiment, mobile device 805 may encounter the local WiFi, at which point the mobile device 805 may join the local WiFi and contact set-top box 801. In one embodiment, the set-top box 801 may strip audio from presented programming and stream it over the local WiFi to the mobile device 805.

Figure 8B:
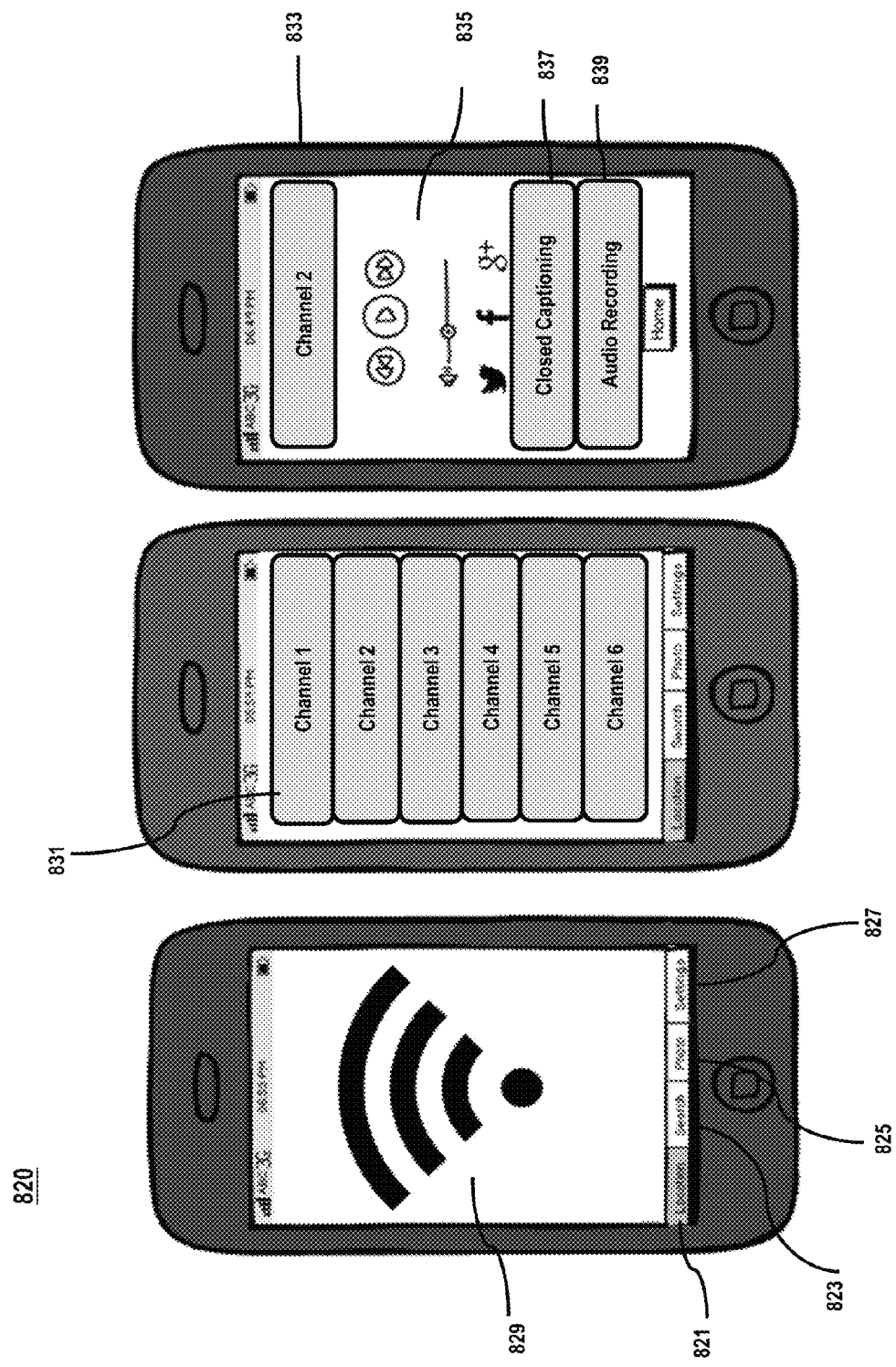
FIG. 8B is a diagram of a user interface utilized in the processes of FIG. 4, according to an exemplary embodiment.

FIG. 8B is a diagram of a user interface utilized in the processes of FIG. 4, according to one embodiment. In one embodiment, user interface 820 may include a location button 821 for to prompt sensor discovery of a user or user device's location. In one embodiment, the location button 821 may find location using global positioning technology (GPS) functions. In a further embodiment, determining the location may render discovery of nearby computing devices or set-top boxes. In one embodiment, the user interface 820 may also include a search button 823, where a user may find a channel, for example, by entering a channel name or number. In a further embodiment, user interface 820 may include photo button 825 for a user to obtain a screen capture of the screen of a channel of which he wishes to receive an audio feed. For example, photo button 825 captures may include video recordings or photographs of a television screen, where available programming may be determined based on the captured video or photographs. Settings button 827 may include, for instance, settings for social accounts (for example social networking options), frequently selected programs, program preferences, display preferences (including volume or closed captioning settings), or a combination thereof.

In one embodiment, the user interface 820 may further include a showing of the device joining a local WiFi network to which a set-top box is connected. For example, the user interface 820 may display symbol 829 when detecting possible communication with a set-top box. In one embodiment, the user interface 820 may further include a listing 831 of channels available by the set-top box within the local WiFi network. In one embodiment, the user may select a channel using the listing 831. Then, the user interface 820 may show a selected channel 833 from which the user has selected to receive an audio feed. Options 835 may present various controls for the audio feed including volume adjustments, play, rewind, or fast-forward. Options 835 may further include shortcuts for various social network options to share the audio feed or simply show that the user is receiving an audio feed. Furthermore, user interface 820 may include closed captioning button 837 or audio recording button 839 to provide the options of displaying closed captioning or recording the audio feed. User interfaces 820 may be available, regardless of whether an audio feed is streamed using a set-top box of multimedia hub.

Figure 9:
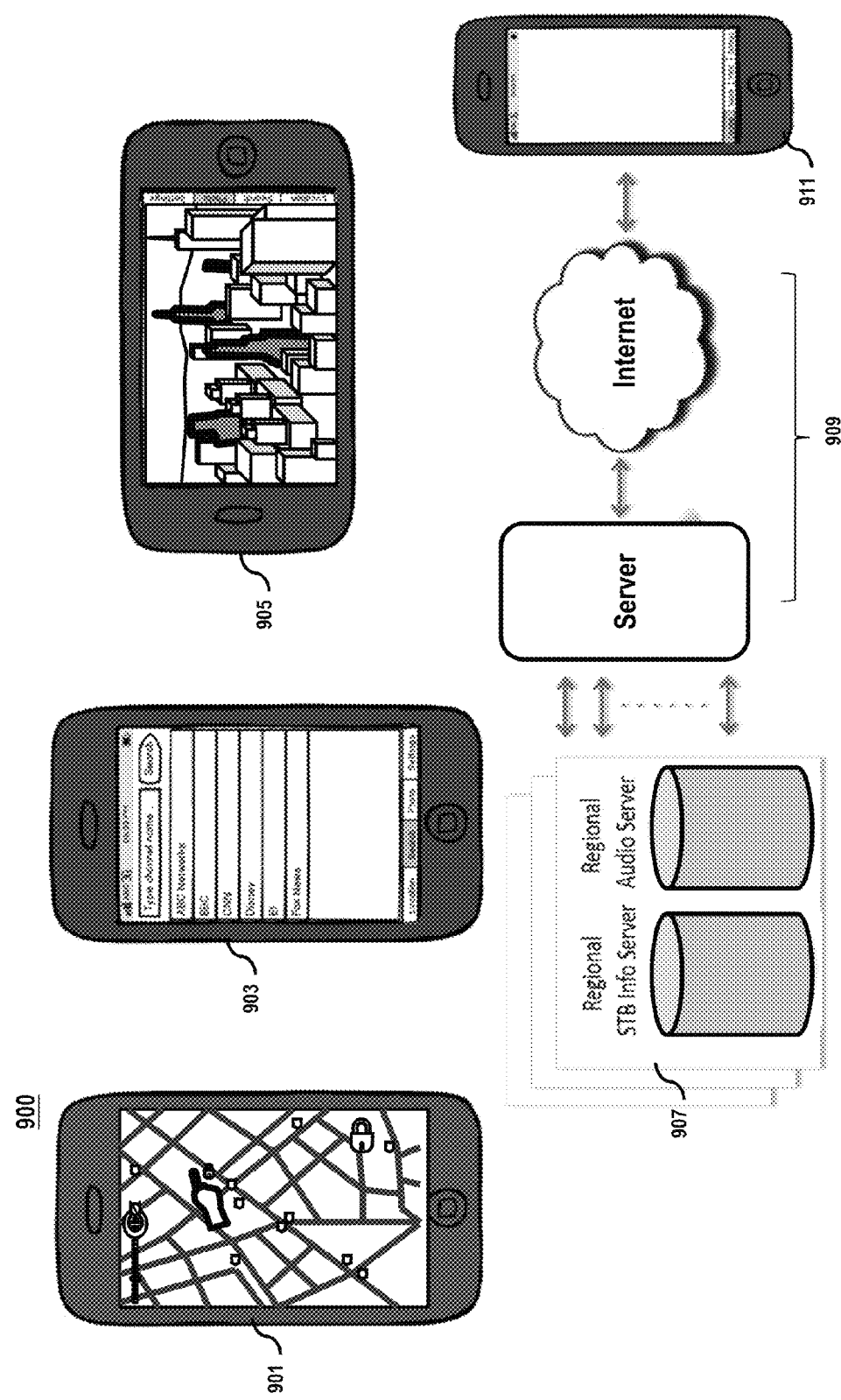
FIG. 9 is a diagram of user interfaces and an alternate system utilized in the processes of FIG. 4, according to an exemplary embodiment.

FIG. 9 is a diagram of user interfaces and an alternate system utilized in the processes of FIG. 4, according to one embodiment. In one embodiment, system 900 may include a display 901 where a user identifies his location using a GPS. Alternately, a user may employ display 903 and search a channel by name or channel number. Furthermore, a user may user an image capture 905 to identify a channel. For example, a user may point a device camera to capture video of a television screen from which he wishes to receive a corresponding audio feed. In one embodiment, system 900 may stream audio feeds over the internet, rather than over a set-top box connected to a WiFi network. To stream audio feeds over the internet, system 900 may include various regional hubs 907. For example, hubs 907 may include video or multimedia hubs, including regional servers. For instance, hubs 907 may include regional set-top box information servers and/or regional audio servers. Hubs 907 may strip audio from channels and save the audio feeds on the servers in hubs 907. In one scenario, the system 900 may stream audio from a specific server within a specific one of the hubs 907 or a specific hub 907 based on a location detected with display 901. To complete the action of streaming audio, system 900 may include an application server 909 that communicates between the hubs 907 and a user device 911.

The processes described herein for providing for providing a metadata management framework may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
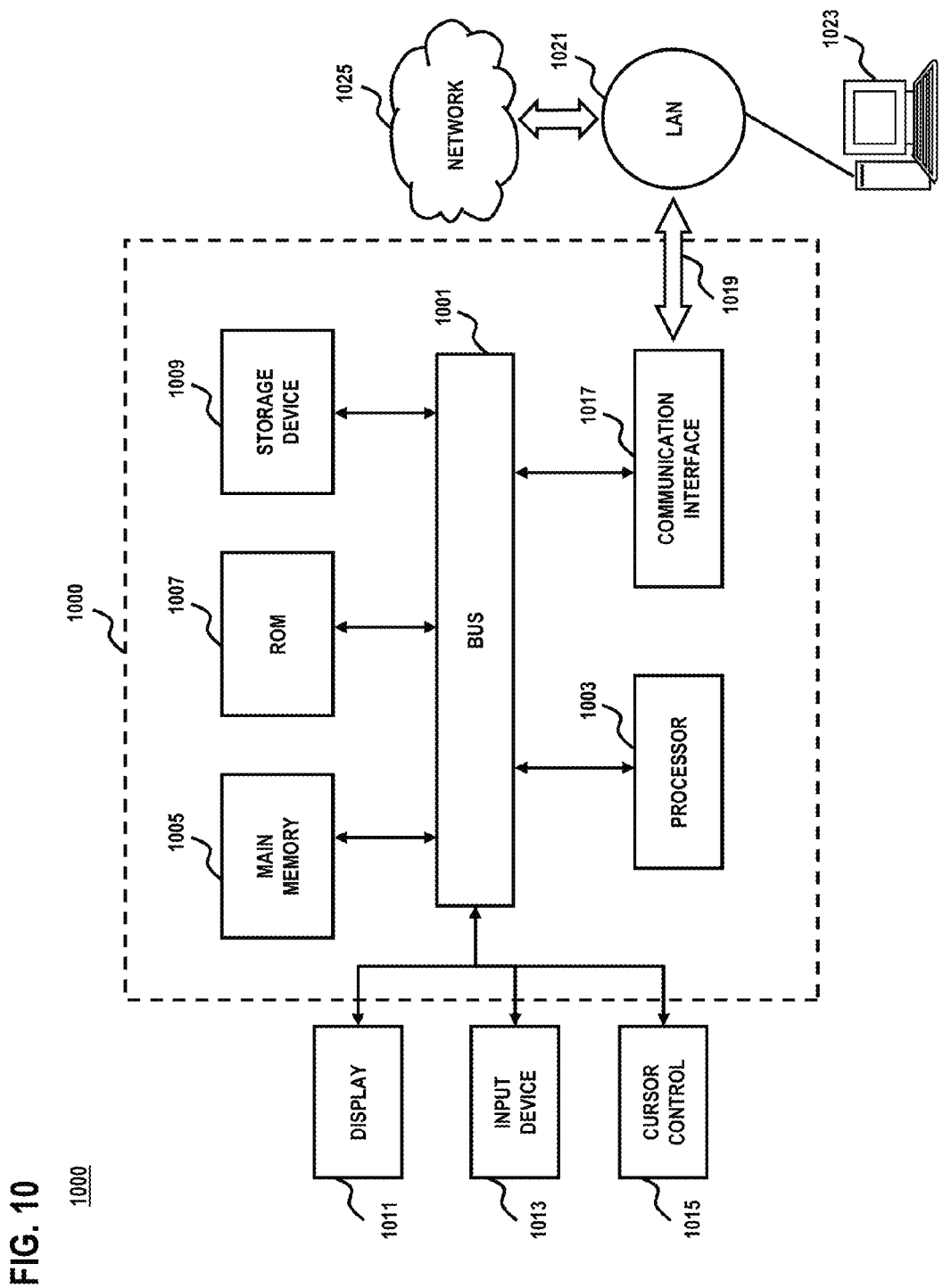
FIG. 10 is a diagram of a computer system that can be used to implement various exemplary embodiments.

FIG. 10 is a diagram of a computer system that can be used to implement various embodiments. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network (s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
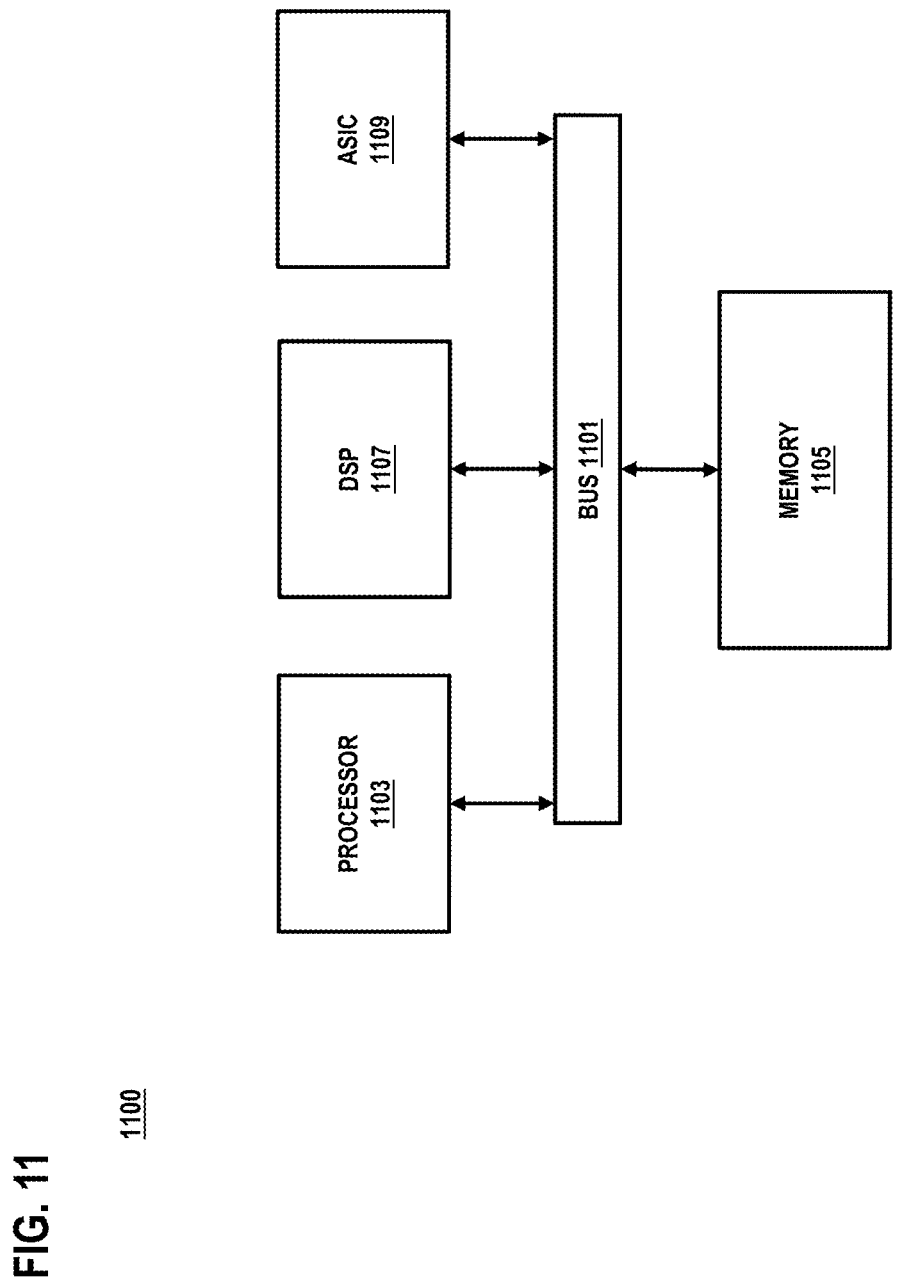
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 4-7.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
performing a location-based search for one or more set-top boxes based on location information associated with a mobile communication device;
processing programming information associated with the one or more set-top boxes proximate a user to determine one or more broadcast television programs concurrently presented for audio output and visual display by the one or more set-top boxes at one or more television sets;
presenting a user interface at the mobile communication device to the user for selecting from among the one or more broadcast television programs;
determining an input from the user received at the mobile communication device for selecting at least one of the one or more broadcast television programs presented at the one or more television sets;
streaming only an audio feed portion of the least one broadcast television program to the mobile communication device associated with the user, the streamed audio feed corresponding to the audio output of the one or more broadcast television programs output at the one or more television sets, wherein the streamed audio feed portion is stripped from the broadcast television program for streaming independently of the broadcast television program output from the one or more television sets; and
playing the streaming audio feed portion only at the mobile communication device while at least one of the television sets associated with the one or more set-top boxes concurrently plays the at least one program by the visual display presented at the one or more television sets.

2. A method of claim 1, wherein the input specifies an identifier associated with at least one of the one or more set-top boxes, the method further comprising:
designating the currently playing at least one broadcast television program as the selected at least one of the one or more broadcast television programs.

3. A method of claim 1, further comprising:
providing a programming recommendation to the user based on the one or more programs selected for streaming by one or more other users.

4. A method of claim 3, further comprising:
determining the one or more other users based on social network information, proximity information, or a combination thereof.

5. A method of claim 1, further comprising:
capturing sensor information from the mobile communication device; and
determining the one or more broadcast television programs, the one or more set-top boxes, or a combination thereof based on the sensor information.

6. A method of claim 5, wherein the sensor information includes camera sensor information, microphone sensor information, near-field communication sensor information, or a combination thereof.

7. A method of claim 1, further comprising:
determining the one or more set-top boxes proximate to the user based on a distance threshold from the mobile communication device.

8. A method of claim 1, wherein the audio feed portion stripped from the broadcast television program is stored according to a location, wherein the mobile communication device receives the stripped audio feed portion based on a location of the mobile communication device and the location of the stored, stripped audio feed portion.

9. A method of claim 1, further comprising:
determining one or more other user devices that are proximate to the mobile communication device and are to receive the at least one of the one or more broadcast television programs.

10. A method of claim 9, further comprising:
determining the one or more other user devices based on at least one of social networking information or interest information.

11. An apparatus comprising:
at least one processor; and
at least one memory including computer program code for one or more programs, the at least one memory and the computer program code configured to, with the at least one processor, cause the apparatus to perform at least the following,
process a location-based search for one or more set-top boxes based on location information associated with a mobile communication device;
process broadcast television programming information associated with the one or more set-top boxes proximate a user to determine one or more broadcast television programs concurrently presented by one or more television sets associated with the one or more set-top boxes by an audio output and visual display;
present a user interface to the user for selecting from among the one or more broadcast television programs;

determine an input from the user received at the mobile communication device for selecting at least one of the one or more presented broadcast television programs presented by the audio output and the visual display via a television set;
stream only an audio feed portion of the least one broadcast television program to the mobile communication device associated with the user, the audio feed portion corresponding with the audio output for presenting the television program at the television set, wherein the streamed audio feed portion is stripped from the broadcast television program for streaming independently of the broadcast television program output by the one or more television sets; and
play the audio feed portion only at the mobile communication device while at least one of the set-top boxes concurrently plays the at least one program via the visual display of the television set, wherein the played audio feed portion corresponds with the audio output at the television set.

12. An apparatus according to claim 11, wherein the apparatus is further caused to:
designate the currently playing at least one program as the selected at least one of the one or more programs.

13. An apparatus according to claim 11, wherein the apparatus is further caused to:
provide a programming recommendation to the user based on the one or more broadcast television programs selected for streaming by one or more other users.

14. An apparatus according to claim 13, wherein the apparatus is further caused to:
determine the one or more other users based on social network information, proximity information, or a combination thereof.

15. An apparatus according to claim 11, wherein the apparatus is further caused to:
capture sensor information from the mobile communication device; and
determine the one or more broadcast television programs, the one or more set-top boxes, or a combination thereof based on the sensor information.

16. An apparatus according to claim 15, wherein the sensor information includes camera sensor information, microphone sensor information, near-field communication sensor information, or a combination thereof.

17. An apparatus according to claim 11, wherein the apparatus is further caused to:
determine the one or more set-top boxes proximate to the user based on a distance threshold from the mobile communication device.

18. An apparatus of claim 11, wherein the audio feed portion stripped from the broadcast television program is stored according to a location, wherein the mobile communication device receives the stripped audio feed portion based on a location of the mobile communication device and the location of the stored, stripped audio feed portion.

19. An apparatus according to claim 11, wherein the apparatus is further caused to:
determine one or more other user devices proximate to the mobile communication device to receive the at least one of the one or more broadcast television programs.

20. An apparatus according to claim 19, wherein the apparatus is further caused to:

determine the one or more other user devices based on at least one of social networking information or interest information.

\* \* \* \* \*